(12) United States Patent  
Boegelein et al.

(10) Patent No.: US 8,167,069 B2  
(45) Date of Patent: May 1, 2012

(54) CHANGEABLE BATTERY PACK ADAPTER AND BATTERY CHANGING SYSTEM

(75) Inventors: Rolf Boegelein, Crailsheim (DE); Christoph Zeidler, Landshut (DE); Franz Hatzl, Hohenthann (DE); Oleg Plastinin, Landshut (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 280 days.

(21) Appl. No.: 12/469,145

(22) Filed: May 20, 2009

(65) Prior Publication Data

US 2009/0288898 A1   Nov. 26, 2009

(30) Foreign Application Priority Data

May 23, 2008  (DE) .................. 10 2008 024 729  
Nov. 12, 2008  (DE) .................. 10 2008 056 895

(51) Int. Cl.  
*B60R 16/04* (2006.01)  
*H01M 2/10* (2006.01)

(52) U.S. Cl. .................. 180/68.5; 429/96; 429/100

(58) Field of Classification Search .......... 180/68.5; 429/96, 97, 99, 100, 123  
See application file for complete search history.

(56) References Cited

U.S. PATENT DOCUMENTS

| | | | | |
|---|---|---|---|---|
| 1,209,962 A * | 12/1916 | Heath | ........... | 180/68.5 |
| 3,003,573 A * | 10/1961 | Lorenz | ........... | 180/68.5 |
| 3,497,090 A * | 2/1970 | Daniels | ........... | 414/347 |
| 3,838,745 A * | 10/1974 | Kappei | ........... | 180/68.5 |
| 3,876,086 A * | 4/1975 | Kappei | ........... | 414/343 |
| 3,989,118 A * | 11/1976 | Hansen | ........... | 180/68.5 |
| 4,227,463 A * | 10/1980 | Pfleger | ........... | 104/34 |
| 5,297,645 A * | 3/1994 | Eckersley et al. | ........... | 180/68.5 |
| 5,360,307 A * | 11/1994 | Schemm et al. | ........... | 414/343 |
| 6,113,342 A * | 9/2000 | Smith et al. | ........... | 414/680 |
| 7,175,379 B2 * | 2/2007 | Sellhorn et al. | ........... | 414/607 |
| 7,258,184 B2 * | 8/2007 | Shorney et al. | ........... | 180/68.5 |
| 2004/0157117 A1 * | 8/2004 | Tamaki et al. | ........... | 429/99 |

* cited by examiner

*Primary Examiner* — J. Allen Shriver, II  
*Assistant Examiner* — James M Dolak  
(74) *Attorney, Agent, or Firm* — Rothwell, Figg, Ernst & Manbeck, P.C.

(57) ABSTRACT

The invention relates to a battery changing system comprising an industrial truck and a battery pack, which is or can inserted into a battery compartment of the industrial truck, wherein the battery pack may be inserted into a lateral access opening of the battery compartment with a first end leading into the battery compartment and may be withdrawn from the battery compartment with its first end at the rear, wherein the battery pack accommodated in the battery compartment can be supported in the vicinity of its first end with at least one rolling body on the base of the battery compartment, and at least one transport device, on which the battery pack can be accommodated. The transport device may comprise a changeable adapter, which can be aligned in a predetermined position for a battery changing operation relative to the industrial truck by means of mutually interacting alignment means.

16 Claims, 9 Drawing Sheets

CHANGEABLE BATTERY PACK ADAPTER AND BATTERY CHANGING SYSTEM

The present invention relates to a changeable battery pack adapter for accommodating a battery pack, which can be withdrawn from a battery compartment of an industrial truck, or for providing a battery pack, which can be inserted into the battery compartment.

In addition, the invention relates to a battery changing system, comprising at least one first industrial truck, at least one battery pack, which is or can be inserted into a battery compartment of the first industrial truck, wherein the battery compartment has at least one lateral access opening for inserting the battery pack, with a first end leading, into the battery compartment and for withdrawing the battery pack, with its first end at the rear, from the battery compartment, wherein the battery pack accommodated in the battery compartment can be supported in the vicinity of its first end with at least one rolling body on the base of the battery compartment, and at least one transport device, on which the battery pack can be accommodated and can be moved away from and towards the industrial truck.

A battery changing system of the mentioned type has been filed by the applicant already in the prior patent application DE 10 2007 031 149.6, wherein the industrial truck 112 claimed therein and in this case illustrated in FIG. 11 has a downwardly protruding projection 111 on the battery pack 114 as a lifting stop for a battery transport device, in particular a fork-lift device, for changing the battery pack. The projection 111 protrudes at a second end 140, which is opposite the first end, beyond a front rim section of the battery compartment base 148, which is close to the access opening 118, and protrudes beyond the lower side of the battery compartment base 148.

This enables the following procedure for changing the battery pack:

A manually-operated fork-lift truck is shifted with its fork prongs beneath the industrial truck 112, with the result that the fork prongs, by being raised, engage underneath the downwardly protruding lifting stop 111 of the battery pack 114 and can ultimately raise the battery pack 114 at its second end 140 to such an extent that it is now only standing on the battery compartment base 148 with the rolling body. Drawing the fork-lift truck back then results in the battery pack 114 rolling out of the battery compartment 116 until finally the fork prongs can completely accommodate the battery pack. The battery pack can then be removed from the industrial truck with the fork-lift truck. However, the battery compartment has stop means which stop the battery pack when it is withdrawn from the battery compartment before the at least one rolling body leaves the battery compartment base during the rolling-out procedure. These stop means can be overcome by the battery pack being raised further and withdrawn from the battery compartment.

Such a battery changing system therefore requires further raising by means of the manually-operated fork-lift truck in order to overcome the stop means.

The object of the invention is to provide a battery changing system in which the battery changing operation is further simplified.

For this purpose, the invention proposes that the transport device of the battery changing system comprises a changeable adapter, which is capable of being aligned in a predetermined position for a battery changing operation relative to the industrial truck by means of mutually interacting alignment means, which are arranged on the changeable adapter and on the industrial truck.

Possible alignment means are in this case, for example, rims, edges, projections or other component parts which make it possible to determine and set a desired relative position of the changeable adapter with respect to the industrial truck.

In addition to the battery changing system, the changeable battery pack adapter is also independently significant in the context of the present application. Preferred developments of the changeable adapter outlined below are therefore applicable both for the changeable adapter itself and for the battery changing system.

The changeable adapter can be coupled to the industrial truck by means of a first coupling apparatus during the battery changing operation, wherein preferably the alignment means act as the first coupling apparatus. A first coupling apparatus produces a connection between the changeable adapter and the industrial truck during the battery changing operation, with the result that the latter jointly act as stationary components, relative to which the battery pack can be moved. The first coupling apparatus formed from the alignment means allows for a solution which is simple in design terms, wherein, when the coupling is produced successively or else simultaneously, both the alignment of the changeable adapter relative to the industrial truck takes place and the connection between these two components can be produced.

The first coupling apparatus for coupling the changeable adapter to the industrial truck is preferably designed in such a way that the coupling can be produced when the changeable adapter is raised relative to the base, which bears the battery pack, of the industrial truck and can be released when the changeable adapter is lowered. In this regard, it is proposed that the first coupling apparatus comprises at least one centring pin on the changeable adaptor, which centring pin engages in a corresponding opening in the base of the industrial truck, in particular in the base of the battery compartment, during raising. In order to achieve the alignment of the changeable adapter relative to the industrial truck, it is proposed that downwardly protruding centring means are provided in the region of the opening in the battery compartment base, by means of which centring means the centring pin can be guided into the opening. As a result, a type of forced centring of the changeable adapter relative to the industrial truck takes place.

The changeable adapter is preferably configured in such a way that a securing stop arranged in the battery compartment can be overcome during the battery changing operation, i.e. in the aligned and preferably coupled state of the changeable adapter relative to the industrial truck, when the battery pack is moved out of the battery compartment onto the changeable adapter and from the changeable adapter into the battery compartment. It is thus possible, as a result of the changeable adapter, for the battery pack to be capable of being moved directly out of the battery compartment onto the changeable adapter or in the reverse direction, without being raised any further.

As a development it is proposed that the changeable adapter comprises at least one guideway, which guides the movement of rolling bodies associated with the battery pack out of or into the battery compartment, wherein preferably two guideways are provided which are arranged laterally spaced apart from one another and on which rolling bodies of the battery pack can move.

In order to secure an accommodated battery pack, the changeable adapter can have a releasable locking element, which can be brought into or is in engagement with the battery pack. Preferably, an end stop can also be provided on the changeable adapter, which end stop in particular comprises the locking element, wherein this end stop is arranged and designed in such a way that the battery pack can be accommodated completely on the changeable adapter.

In the case of the battery changing system, it is additionally proposed that, at a second end which is opposite the first end, the battery pack comprises at least one further rolling body, which, in the inserted state of the battery pack, protrudes downwards over the upper side of the battery compartment base and is provided as a lifting stop for the changeable adapter for the raising and withdrawal of the battery pack.

Preferably, the battery changing system comprises a shifting frame, which bears the battery pack, is capable of moving jointly with the battery pack and has the rolling bodies, wherein the shifting frame preferably represents a component which is separate from the battery pack and which forms a type of carriage, from which the battery pack can be removed, if required, for example by virtue of the fact that the battery pack is raised out of the shifting frame by means of a hoist and is removed.

In accordance with a preferred development, in each case at least two rollers are provided laterally spaced apart from one another as rolling bodies both at the first end and at the second end of the battery pack or of the shifting frame. This makes it possible for the battery pack to be stably supported on at least four rollers during the battery changing operation.

Preferably, a respective roller pair is provided at the first and at the second end of the battery pack, wherein the rollers of the two roller pairs are laterally spaced apart from one another by the same distance and are arranged at identical lateral positions in relation to the shifting frame. As a result, in each case two rollers of the two pairs are aligned in the movement direction of the battery pack. The two roller pairs form inner roller pairs in relation to the lateral extent, and, as a development, it is proposed that a further outer roller pair is provided at the first end, with the rollers of said roller pair each being provided further towards the outside on the shifting frame or on the battery pack, in particular in the corner regions thereof.

During the battery changing operation and when the battery pack is inserted into the battery compartment, the battery pack is preferably supported with the outer roller pair of the first end on the battery compartment and with the inner roller pair of the second end on the changeable adapter. This makes it possible for the battery pack to be withdrawn from the battery compartment, wherein the movement takes place by rolling of the inner roller pair of the second end and of the outer roller pair of the first end.

In order to allow for a precise movement of the battery pack, it is proposed that guideways are provided in the battery compartment and on the changeable adapter, on which guideways respective rollers of a relevant roller pair of the battery pack can roll, with the result that the battery pack is capable of moving along the guideways between the battery compartment and the changeable adapter during the battery changing operation.

Preferably, the guideways, in particular those on the changeable adapter, are formed in such a way that, during the movement of the battery pack, a securing stop arranged in the battery compartment can be overcome. For this purpose, those end sections of the guideways of the changeable adapter which face the battery compartment during the battery changing operation are designed so as to rise away from the battery compartment and then to be substantially horizontal such that, during the battery changing operation, the battery pack is positioned higher on the changeable adapter than in the battery compartment, as a result of which the mentioned securing stop in the battery compartment can be overcome. In accordance with a development, the guideways have raised guide profiles in comparison with the battery compartment base and the changeable adapter base, and the rollers have concave guide grooves which run around along the roller periphery and into which the guide profiles of the guideways engage when the battery pack is moved. Such raised guide profiles are self-cleaning to the extent that no dirt or only a small amount of dirt is deposited on them, with the result that the battery changing system can be operated with little maintenance.

Guideways for the outer roller pair of the first end are preferably provided in the battery compartment, on which guideways the battery pack can roll when moved and is supported in the inserted state, wherein the inner roller pair of the first end, which is arranged between the two rollers of the outer roller pair, is arranged so as to float freely above the battery compartment base. Owing to the fact that the battery pack is supported on the outer two rollers, a very stable bearing arrangement of the battery pack during the movement and in the inserted state in the battery compartment is ensured.

The guideways of the battery compartment and the guideways of the changeable adapter can have a region of overlap during the battery changing operation in the battery movement direction, such that, when the battery pack is withdrawn from the battery compartment, the support of the battery pack in the region of overlap transfers from the outer roller pair to the inner roller pair of the first end, wherein the outer roller pair is lifted off from the battery compartment guideways. During this raising movement, in addition the abovementioned securing stop is also overcome, which securing stop can be arranged, for example, at the ends of the battery compartment guideways, in the direction of withdrawal of the battery pack.

In order to enable and simplify the raising of the inner roller pair at the second end of the battery pack, it is proposed that the battery compartment base has, in the region of the access opening, a cutout, which has the front rim section of the battery compartment base, with the result that the rolling body or the inner roller pair of the second end protrudes downwards through the cutout when the battery pack is inserted. In this context, it is further proposed that the changeable adapter has a lug which can be inserted into the cutout of the battery compartment base, in such a way that, during the battery changing operation and when the battery pack is inserted, the rolling body or the inner roller pair of the second end of the battery pack is supported by the lug. In this case, the inner roller pair of the second end is preferably supported on the end sections, which are arranged on the lug, of the guideways.

In order to be able to use the changeable adapter possibly also with a differently configured battery pack, in particular a battery pack such as the one contained in FIG. 11, which is described at the outset, the first coupling apparatus can be connected releasably to the changeable adapter. This allows for temporary removal of the centring mandrel, with the result that the adapter can be pushed beneath the base of the industrial truck.

It is additionally proposed that the changeable adapter can be coupled to the battery pack by means of a second coupling apparatus during the battery changing operation, preferably when the first coupling apparatus is removed from the changeable adapter. As a result, the changeable adapter can be used universally for different battery packs with and without rollers at the second end thereof.

Preferably, in this case the second coupling apparatus is designed in such a way that the coupling between the changeable adapter and the battery pack can be produced when the changeable adapter is raised relative to the base, which bears the battery pack, of the industrial truck and can be released when the changeable adapter is lowered.

The second coupling apparatus preferably has an accommodating depression, which runs transversely with respect to the movement direction of the battery pack and with which a coupling projection, which is provided on the lower side of the battery pack, can be brought into engagement.

A changeable adapter with first and second coupling apparatuses, in which the first coupling apparatus is preferably removable, allows for the universal use of this changeable adapter for various embodiments of battery packs.

The changeable adapter can be accommodated on a further industrial truck, in particular a manually-operated fork-lift truck or a fork of a fork-lift truck, wherein the changeable adapter is preferably accommodated on the load pickup means, i.e. the fork, in such a way that, during the battery changing operation, the load pickup means bears with end sections, which are not covered by the changeable adapter, against the lower side of the battery compartment base. Owing to the fact that the end sections of the forks bear against the lower side of the battery compartment base, an upper stop position is fixed, with the result that the changeable adapter cannot be raised any further. In addition, the fact that the end sections of the load forks stop against the lower side of the battery compartment base also allows for a type of level compensation if the ground is not completely flat or if the battery compartment base is not running precisely parallel to the ground owing to the fact that tyres of the industrial truck are worn to different extents. When the load forks are raised, they may to a certain extent elastically deform in their stop position at the lower side of the battery compartment base, with the result that level compensation between the battery compartment base and the ground is made possible, as a result of which optimum transition between the battery compartment base and the changeable adapter is ensured.

It is also conceivable for the changeable adapter to be fixedly connected to the manually-operated lift truck, with the result that a type of adapter vehicle is formed. Alternatively, it is also conceivable for a lifting apparatus and wheels for moving the adapter to be attached to the changeable adapter itself, with the result that a type of adapter truck is formed.

The changeable adapter is in addition formed in such a way that it can be removed from the industrial truck, for example with a battery pack accommodated thereon, and can be deposited at another point on the manually-operated fork-lift truck, for example in the vicinity of a charger, to which the battery pack is intended to be connected.

The invention furthermore relates to a method for inserting or removing a battery pack on an industrial truck in a battery changing system as described above, wherein the method comprises the steps of: opening the access opening of the battery compartment of the industrial truck; feeding a changeable adapter to the battery compartment, preferably by means of a second industrial truck, in particular a manually-operated lift truck; aligning the changeable adapter in a predetermined relative position in relation to the industrial truck for the battery changing operation, wherein the changeable adapter is raised in particular into an upper stop position; moving a battery pack, which is accommodated in the battery compartment, onto the changeable adapter or moving a battery pack, which is accommodated on the changeable adapter, into the empty battery compartment; lowering the changeable adapter; removing the changeable adapter, possibly with the battery pack accommodated, from the industrial truck.

As a development it is proposed that, in the method, a coupling between the changeable adapter and the industrial truck is produced, which coupling is effective during the battery changing operation, wherein the coupling is preferably produced or released by the changeable adapter being raised or lowered.

The proposed battery changing system makes it possible, after alignment and preferably coupling between the changeable adapter and the industrial truck, for a battery pack to be withdrawn from or inserted into the battery compartment without a further lifting actuation needing to be performed in order to overcome a securing stop. The battery pack is therefore capable of being moved, without interruption, from its position in which it is inserted in the battery compartment to the end stop onto the changeable adapter, which in particular simplifies the maintenance and replacement of such battery packs.

The invention will be explained in more detail below using an exemplary embodiment with reference to the attached figures.

Figure 3:
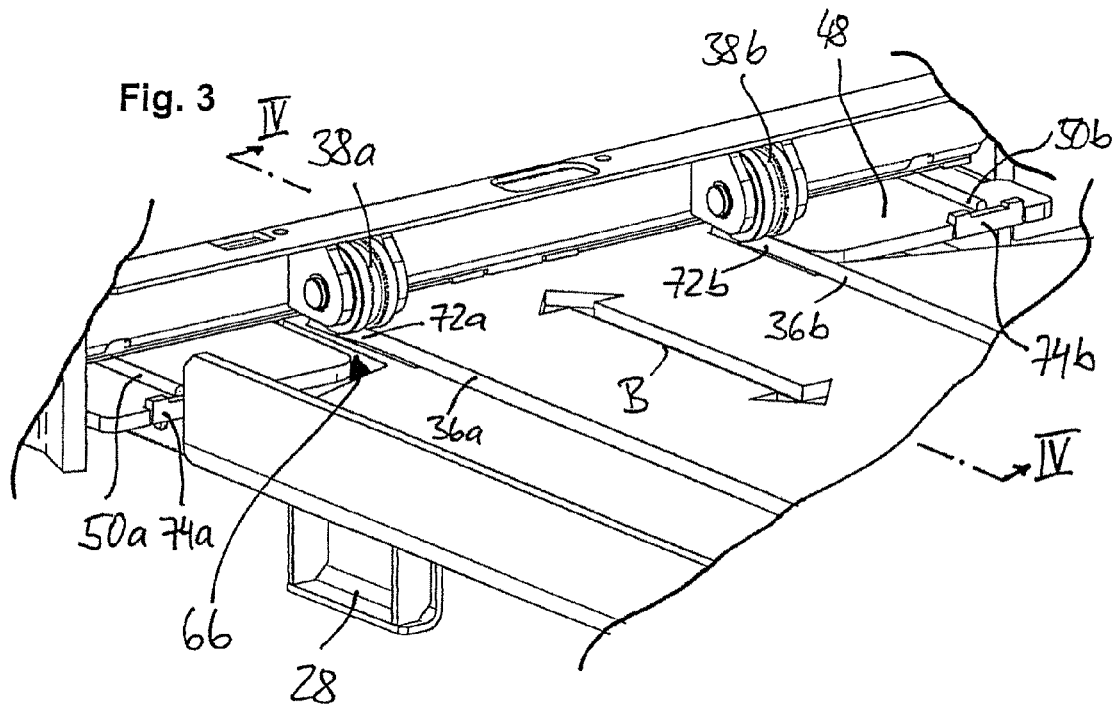
FIG. 3 shows a very enlarged view of rollers at a first end of the battery pack, which rollers are supported on guide profiles of the adapter.
Figure 5A:
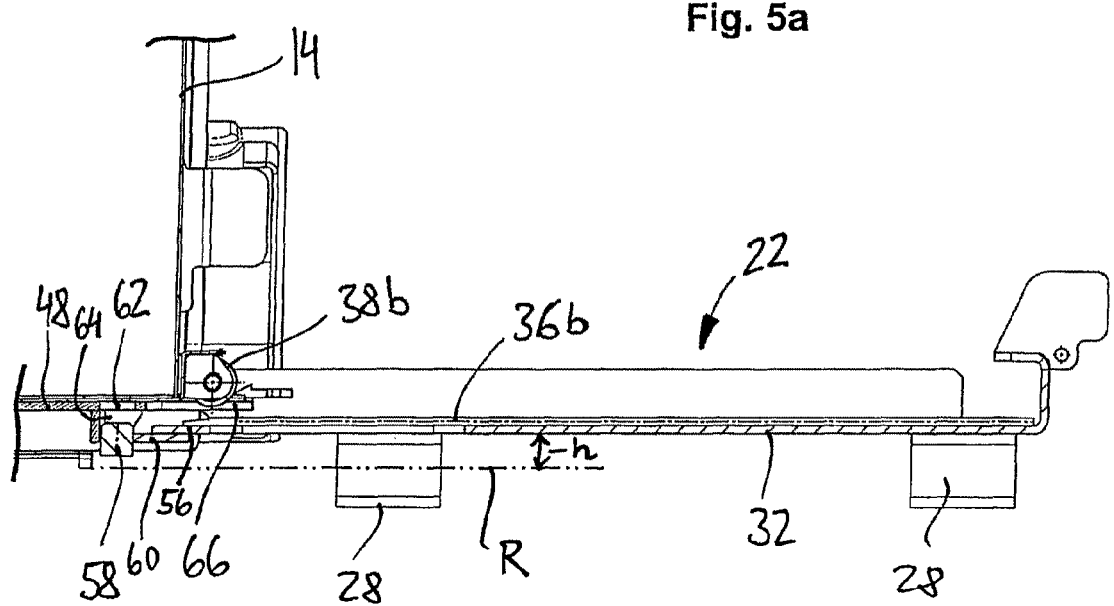
Figure 5B:
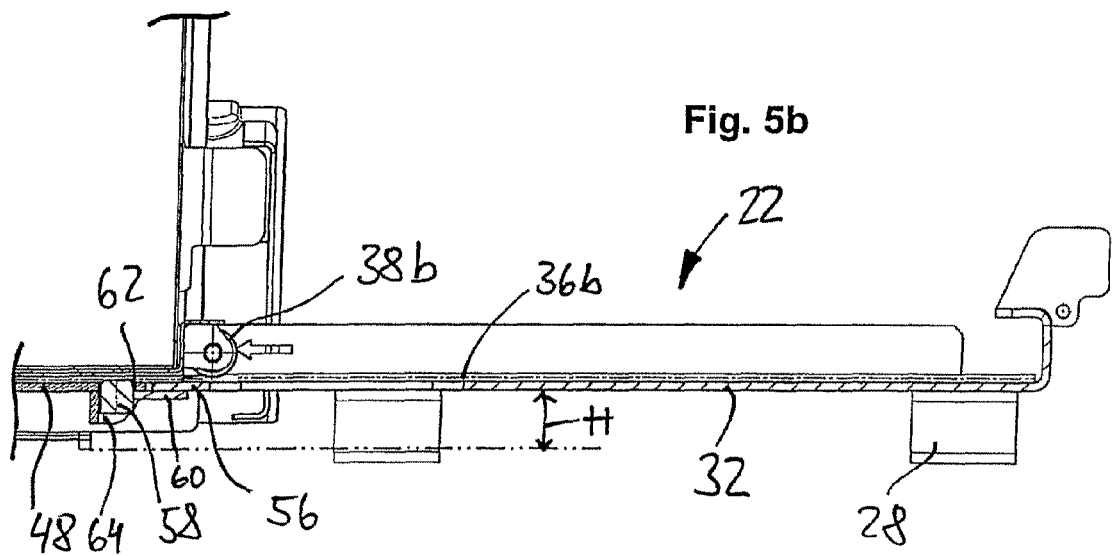
Figure 5C:
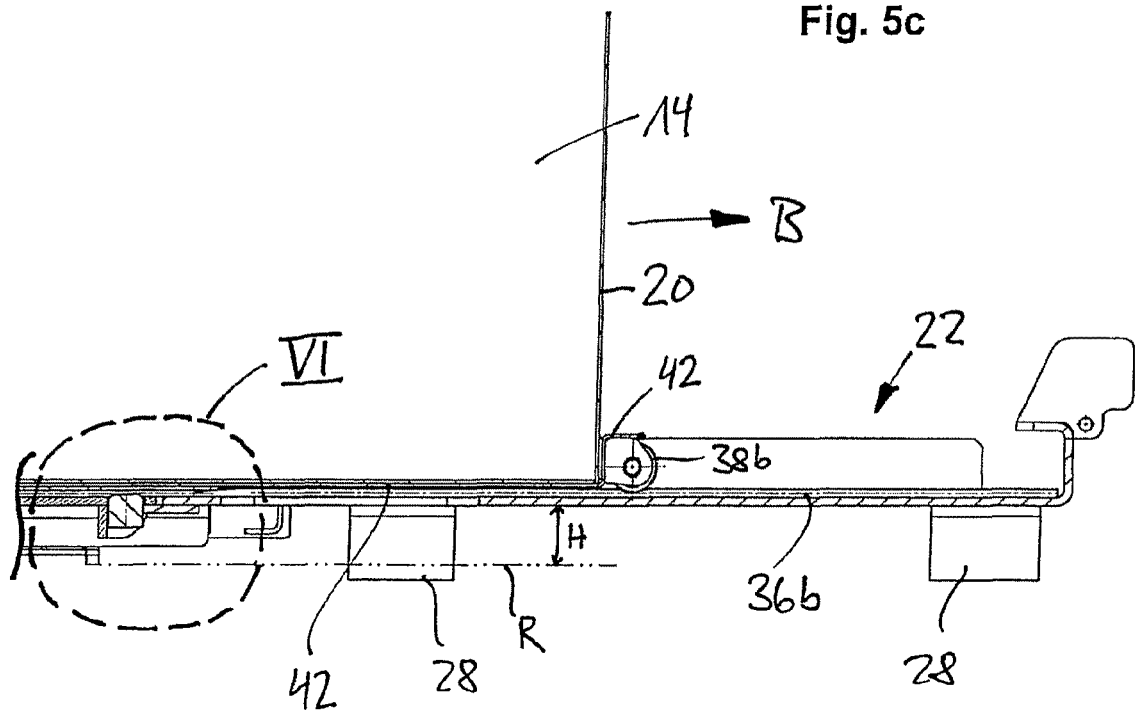

FIGS. 5a to 5c show sectional illustrations along the section line IV-IV in FIG. 3, with the changeable adapter in FIG. 5a being illustrated in a position in which it is released from the industrial truck, and being illustrated in FIGS. 5b and 5c during the battery changing operation, with FIG. 5b showing the state directly at the beginning of the battery changing operation and FIG. 5c showing a battery pack, half of which has been moved onto the changeable adapter.

Figure 6:
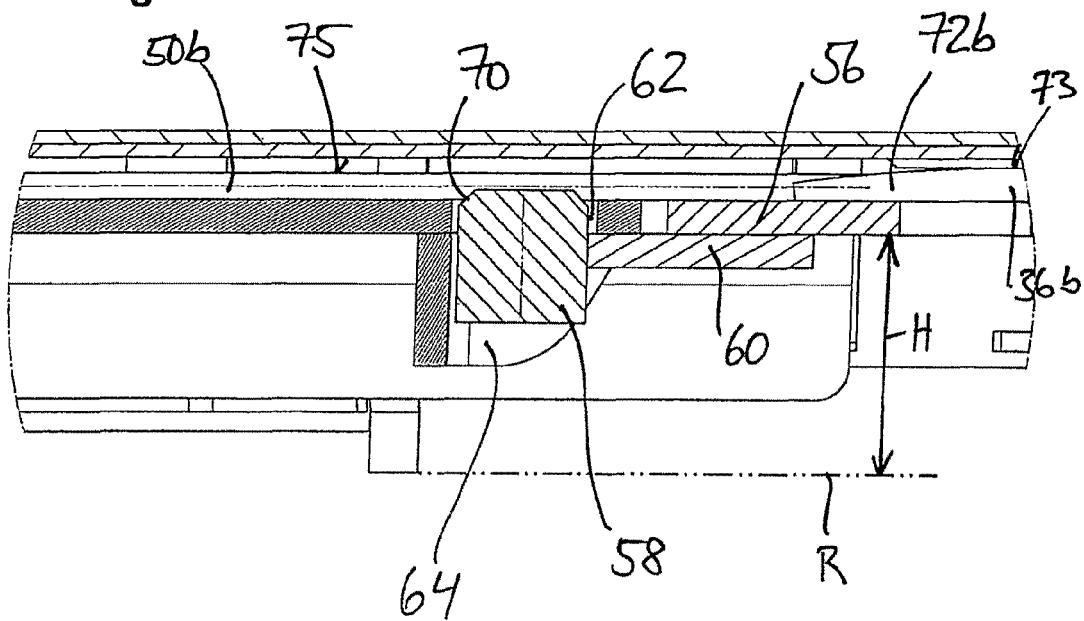

FIG. 6 shows an enlarged cross-sectional illustration of the region VI which is encircled by dashed lines in FIG. 5c of the coupling apparatus, which brings about the alignment between the changeable adapter and the industrial truck.

Figure 7A:
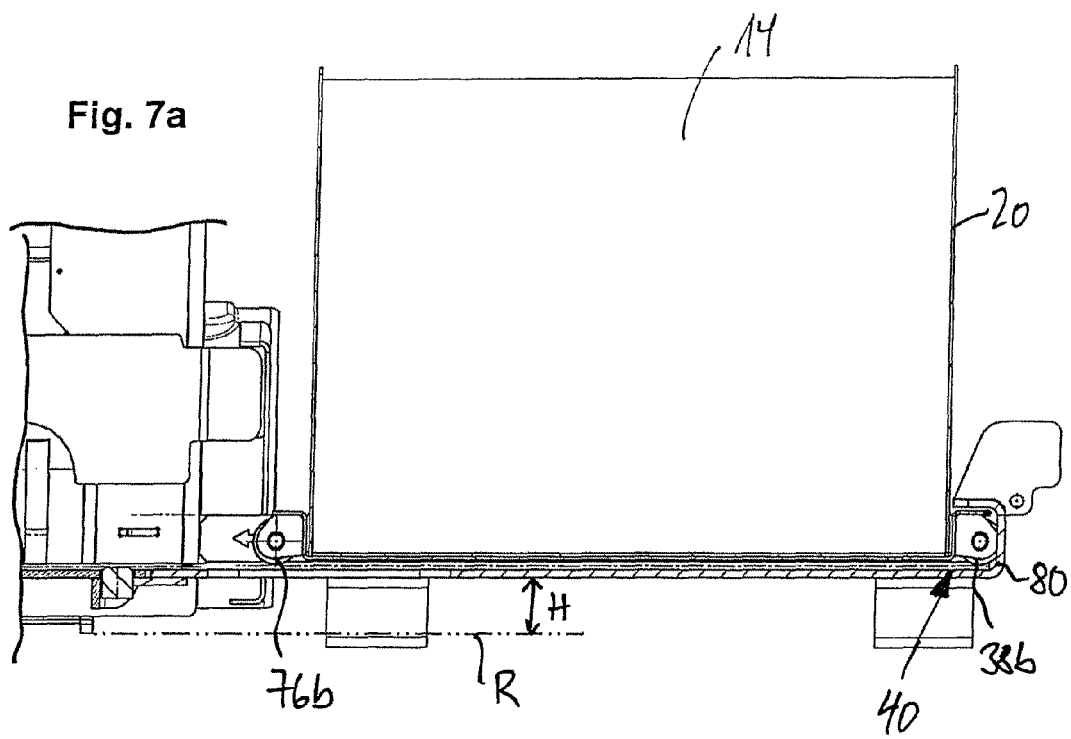
Figure 7B:
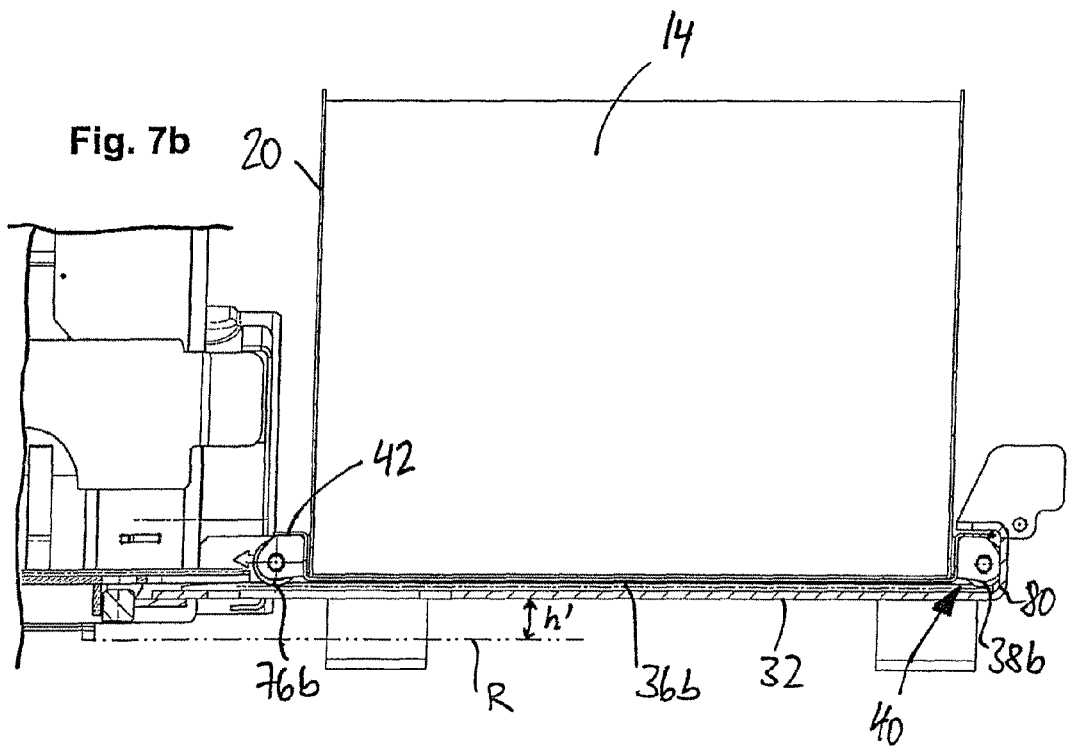

FIGS. 7a and 7b likewise show sectional illustrations along the section line IV-IV in FIG. 3, with the battery pack being completely accommodated on the changeable adapter, and with FIG. 7a showing the state at the end of the battery changing operation and FIG. 7b showing the changeable adapter which has been lowered and therefore released from the industrial truck.

Figure 8A:
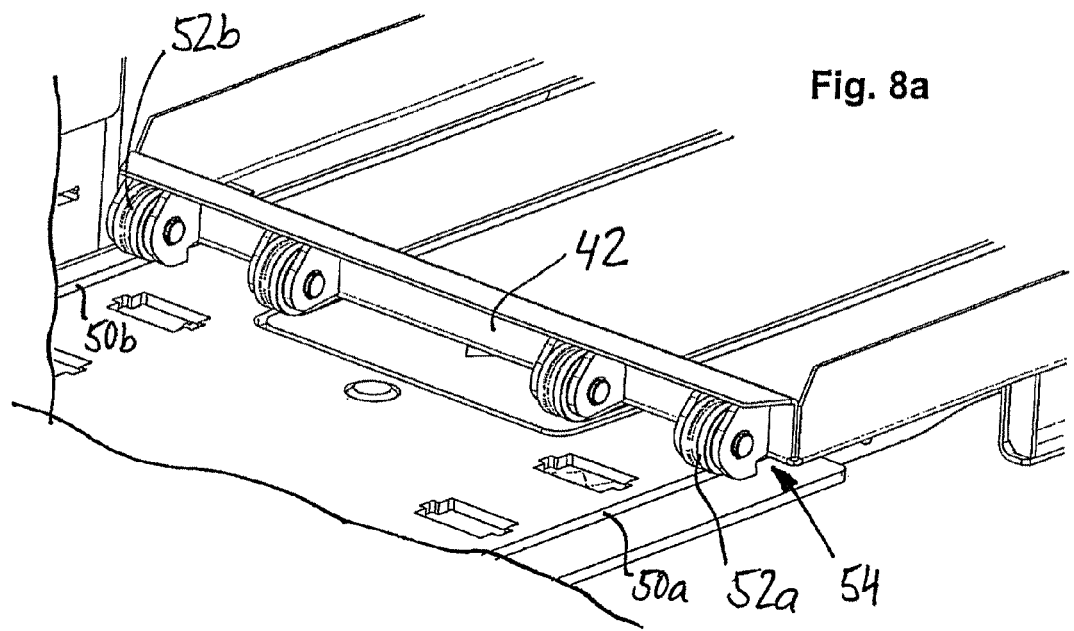
Figure 8B:
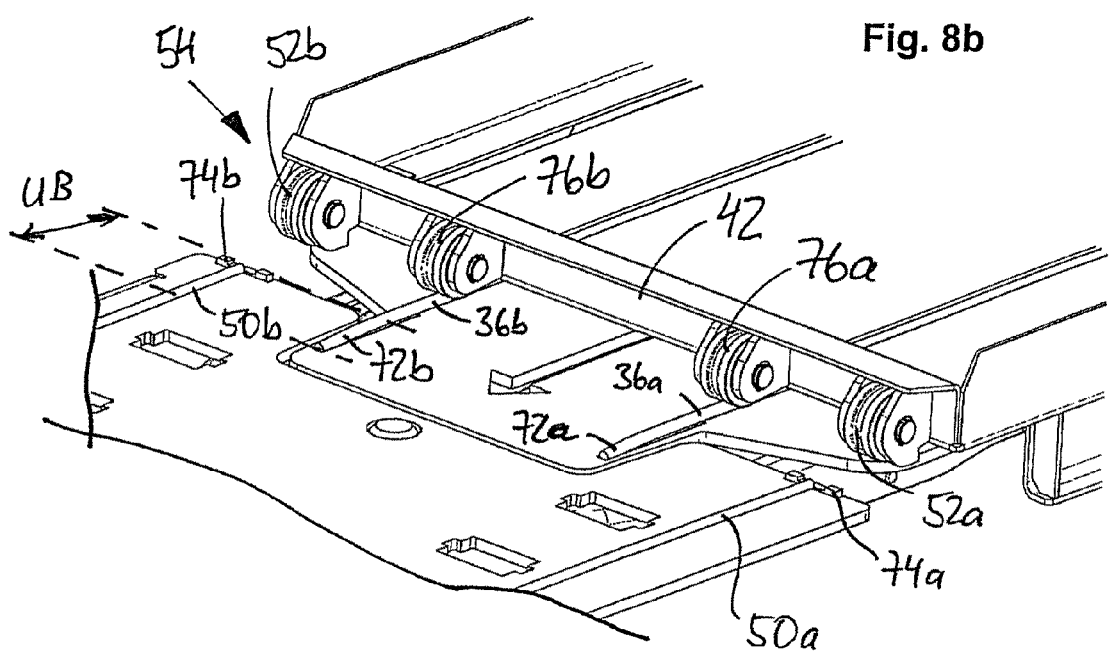

FIGS. 8a and 8b show two states of roller pairs arranged at the second end of the battery pack during the transition between the battery compartment and the changeable adapter.

Figure 9:
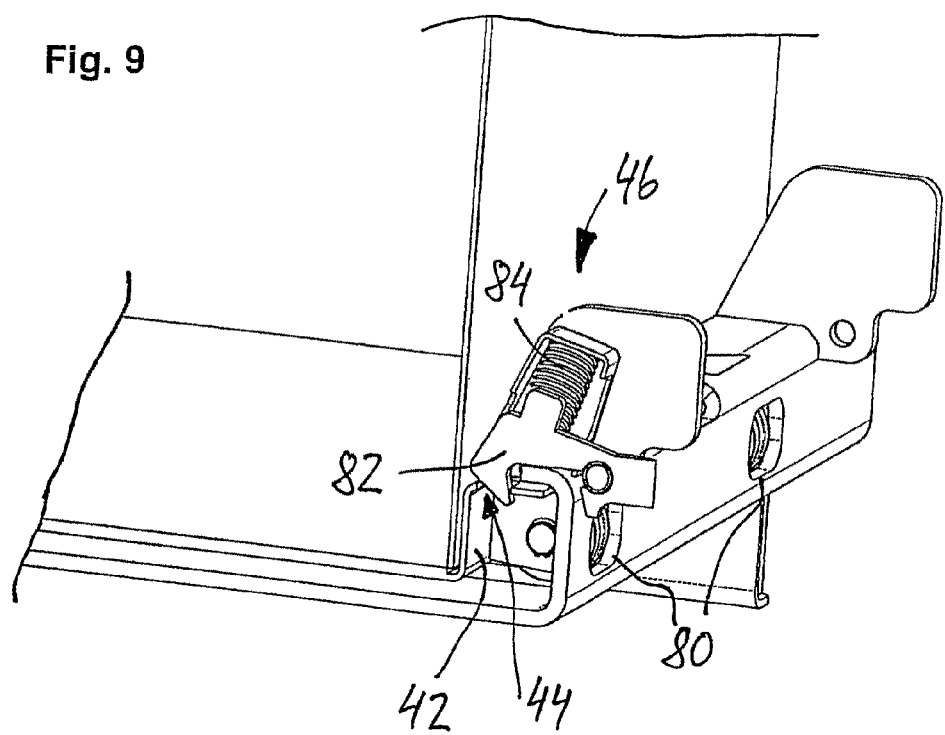

FIG. 9 shows a schematic perspective view of a locking element on the changeable adapter for securing the accommodated battery pack.

Figure 10:
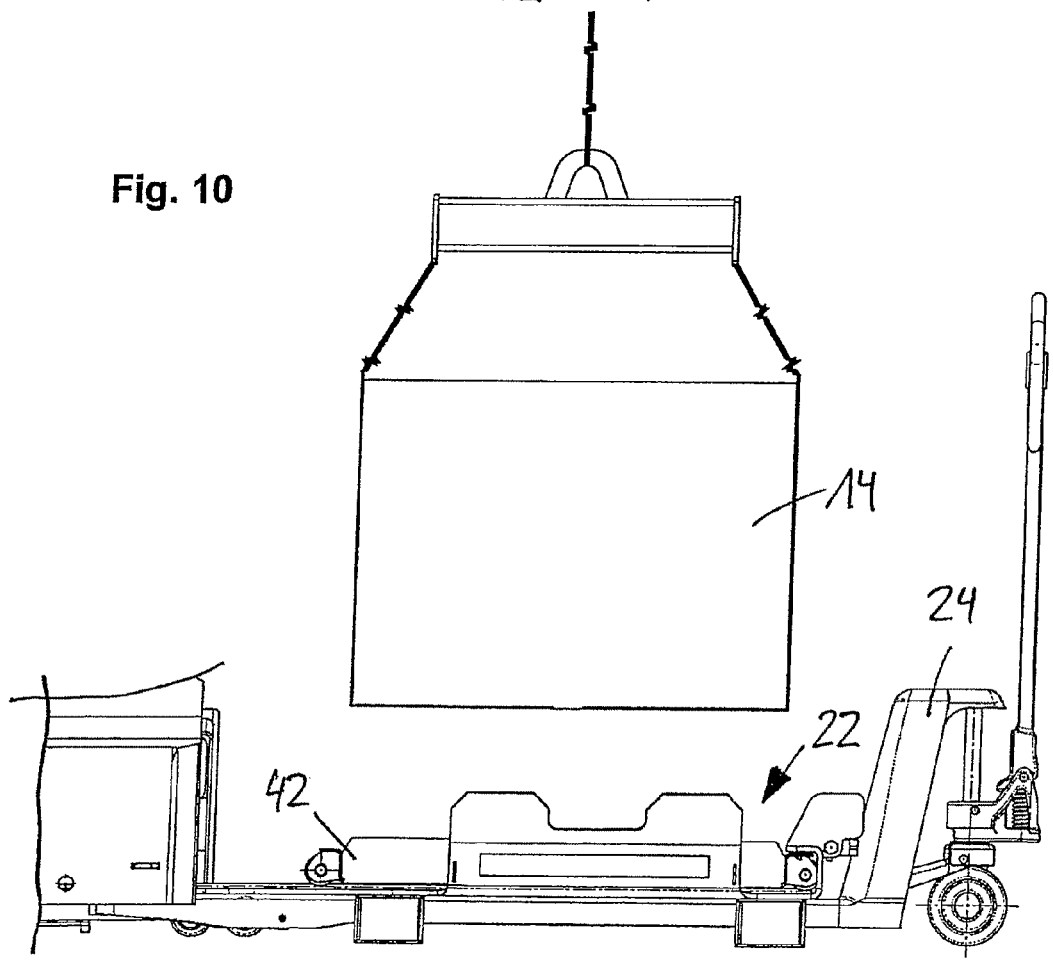

FIG. 10 shows the raising of the battery pack from a shifting frame arranged on the changeable adapter.

Figure 11:
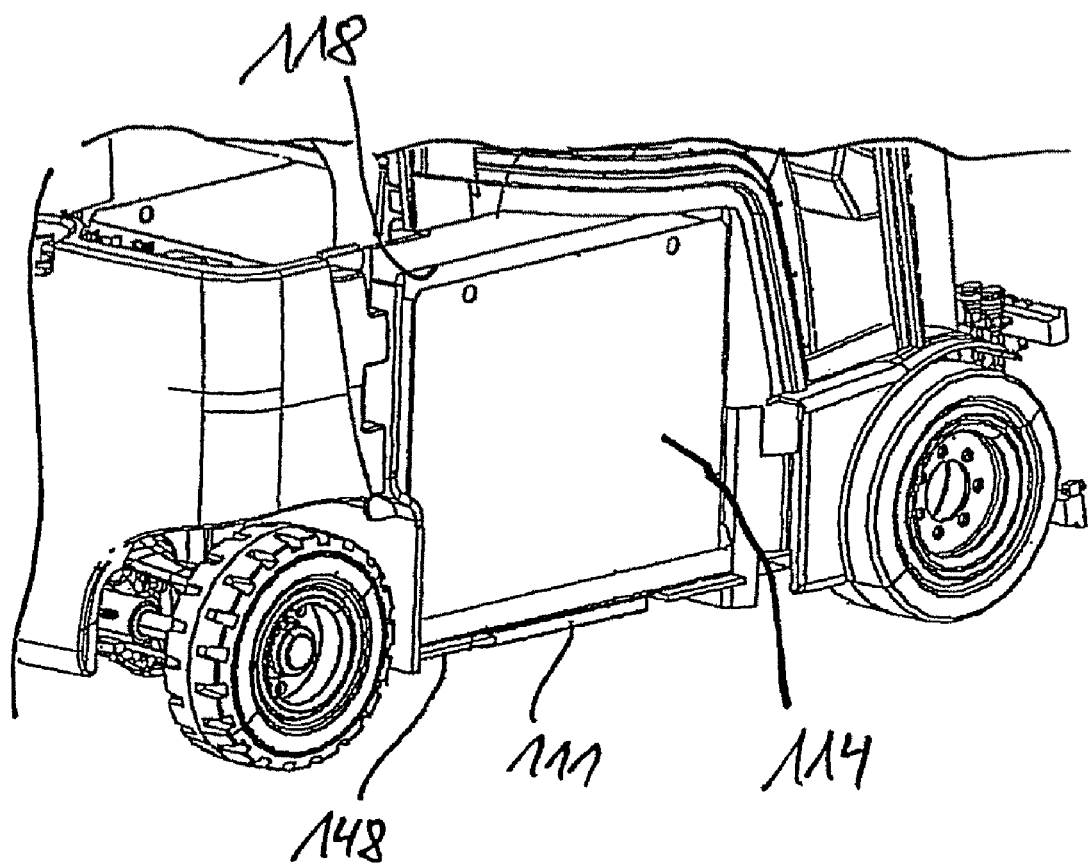

FIG. 11 shows a known battery changing system by the applicant.

Figure 12:
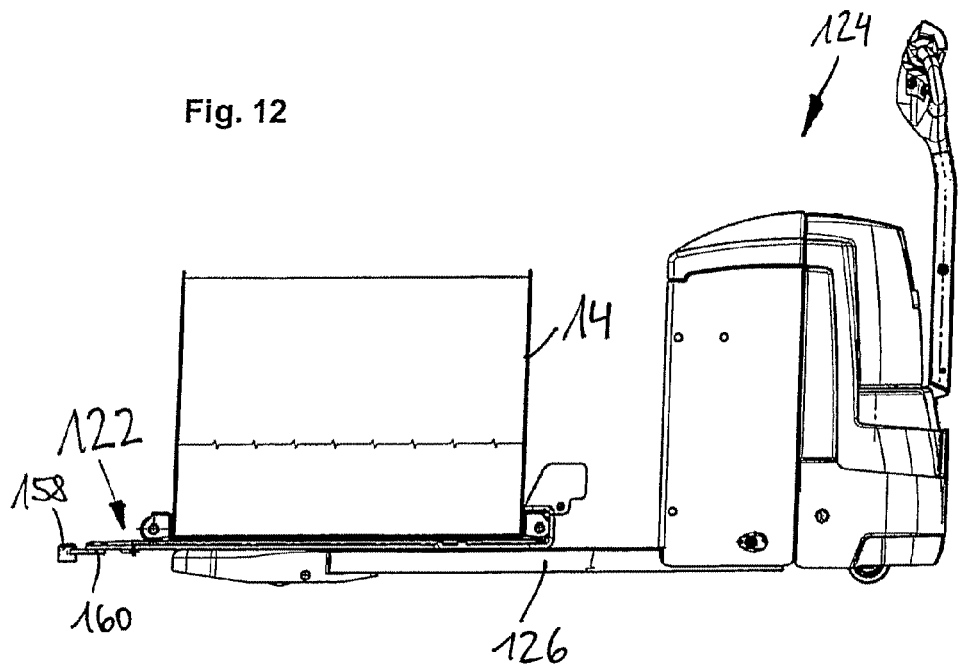

FIG. 12 shows an alternative embodiment of the changeable adapter, which is fixedly connected to a manually-operated fork-lift truck.

Figure 13:
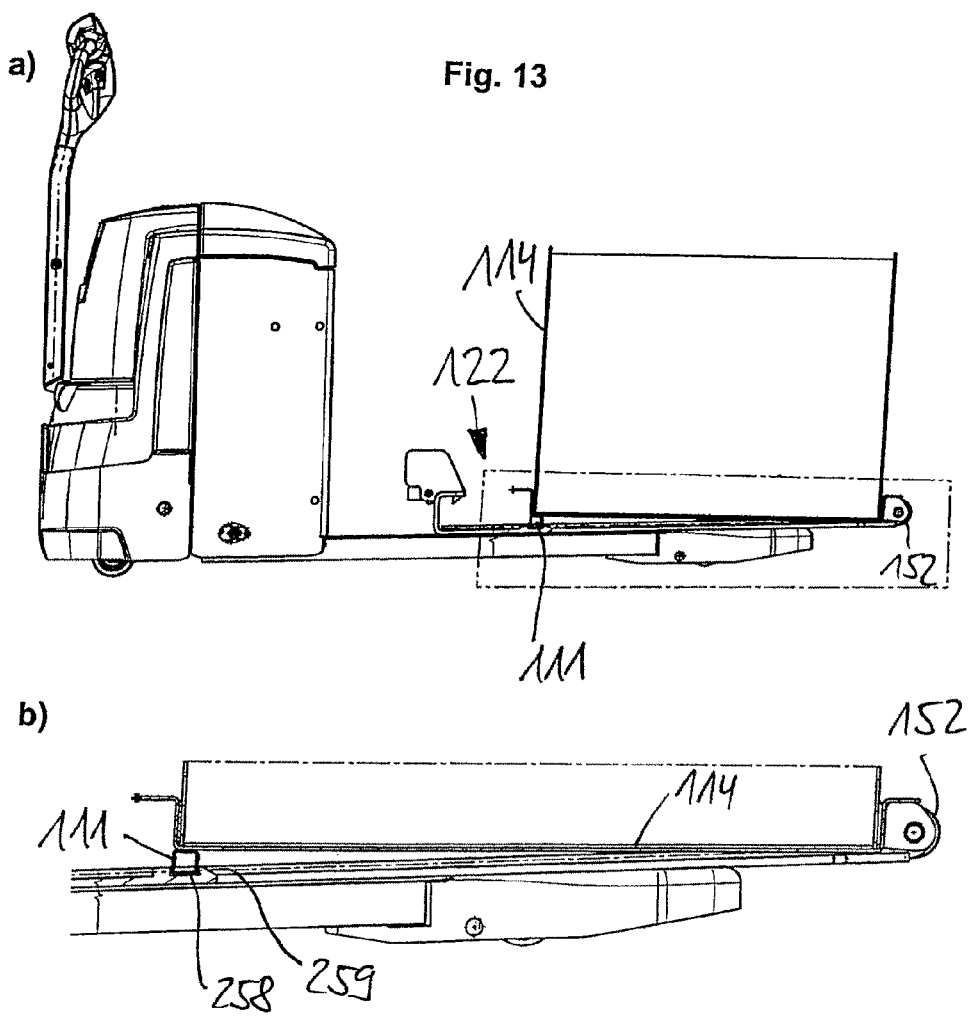

FIG. 13 shows, in subfigure a), the changeable adapter from FIG. 12 without the first coupling apparatus and, in subfigure b), an enlargement of a second coupling apparatus.

Figure 1:
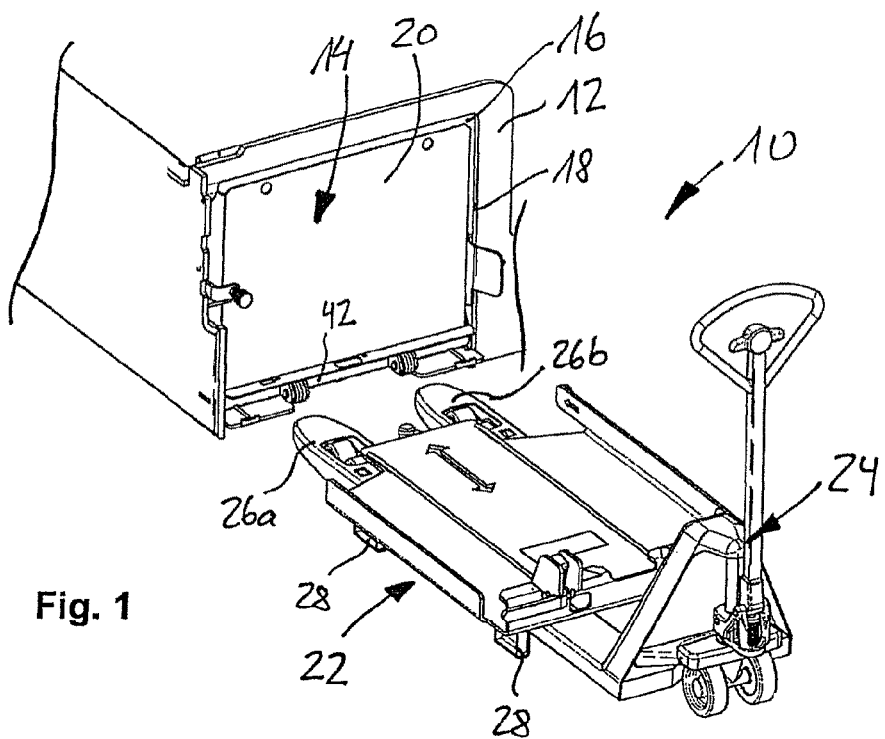
FIG. 1 shows a perspective partial illustration of a changeable adapter arranged on a manually-operated lift truck, with the manually-operated lift truck being positioned in front of an access opening of a battery compartment with the battery pack inserted.

A battery changing system 10 shown in FIG. 1 comprises an industrial truck 12 (only indicated here by its vehicle frame construction), a battery pack 14, which has been inserted into a battery compartment 16, wherein the battery compartment 16 has a lateral access opening 18 for withdrawing or inserting the battery pack 14. In the present example, the battery pack 14 comprises a battery container 20, in which a plurality of batteries are accommodated and electrically wired to one another. In addition, the battery changing system 10 comprises a changeable adapter 22, which is arranged on a manually-operated lift truck 24, in the present exemplary embodiment, and can be moved by means of the manually-operated lift truck 24. The manually-operated lift truck 24 has two load forks 26a and 26b, on which the changeable adapter 22 rests.

The changeable adapter 22 has two feet 28 on each side, with the changeable adapter being capable of being set down on a floor on said feet 28. The feet 28 have a height which is dimensioned such that the load forks 26a, 26b of the manually-operated lift truck 24 can be moved beneath the changeable adapter 22 in the lowered state. However, this height is also dimensioned such that the feet 28 are raised up from the ground by the load forks 26a, 26b being raised slightly, with the result that the changeable adapter 22 rests on the load forks 26a, 26b at a small height above the ground and can be moved by means of the manually-operated lift truck 24.

Figure 2:
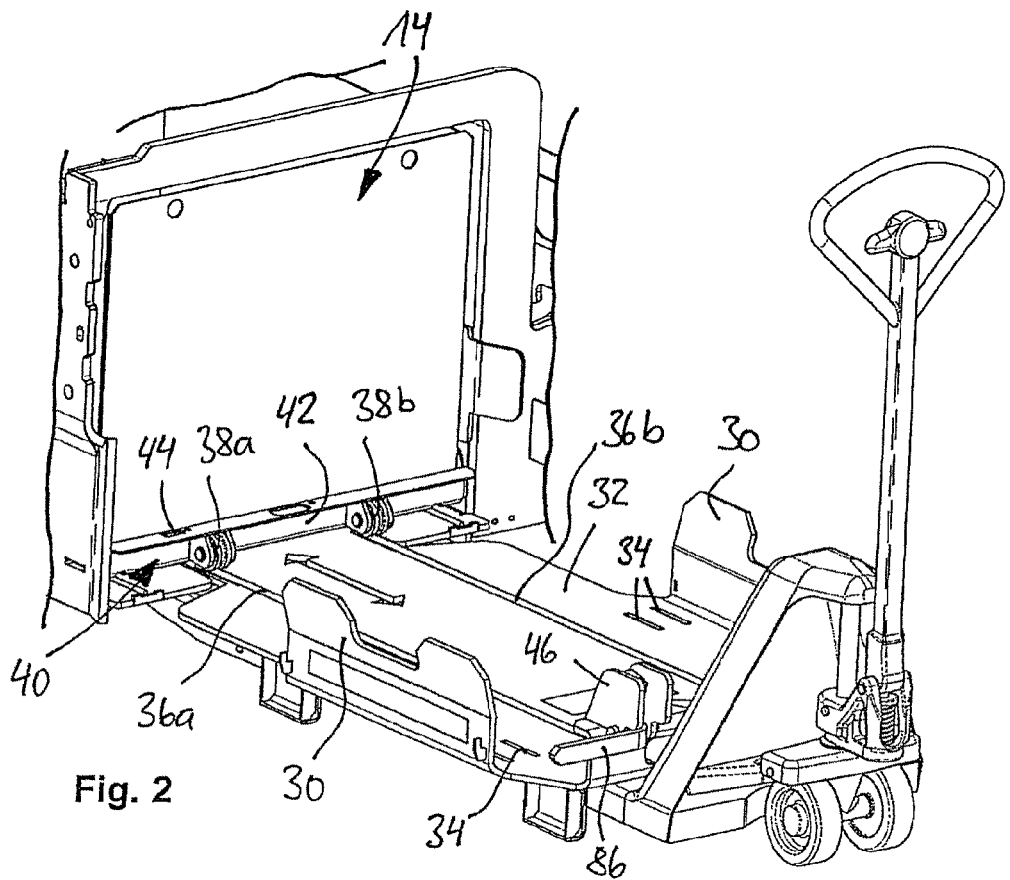
FIG. 2 shows an enlarged perspective view of the manually-operated lift truck with a changeable adapter in the aligned and coupled state on the industrial truck.

It can also be seen from FIG. 2 that the changeable adapter 22 has lateral limit walls 30, which laterally secure and guide a battery pack accommodated on the changeable adapter 22. In addition, slots 34 are shown in the base 32 of the changeable adapter 22, into which slots side-wall plug-in elements (not illustrated here) can be inserted in order to enable lateral guidance for a battery pack with a relatively small width.

In addition, two rail-like guide profiles 36a, 36b arranged on the changeable adapter 22 are shown, on which guide profiles two rollers 38a, 38b of a second end 40 of the battery pack 14 can be supported if the changeable adapter 22 (as illustrated in FIG. 2) is arranged in a predetermined relative position with respect to the industrial truck 12.

In this exemplary embodiment, the battery pack 14 is accommodated in a shifting frame 42 or battery carriage 42 having the rollers 38a, 38b, the battery carriage 42 having an engagement opening 44 at its second end 40, into which engagement opening a hook-like latch of a locking element 46 on the changeable adapter 22 can engage, which will be described in more detail later on.

FIG. 3 shows an enlarged illustration of the rollers 38a and 38b, which are supported on the guide profiles 36a and 36b of the changeable adapter 22 when the changeable adapter 22 is arranged on the industrial truck during the battery changing operation. Two outer guide profiles 50a and 50b are attached to the base 48 of the battery compartment 16, on which guide profiles respective rollers 52a and 52b (FIG. 8a) are supported and are capable of rolling when the battery pack 14 or the battery carriage 42 is located at least partially in the battery compartment 16. The rollers 52a and 52b, which form an outer roller pair, are attached to a first end 54 of the battery pack 14 or of the battery carriage 42.

Figure 4:
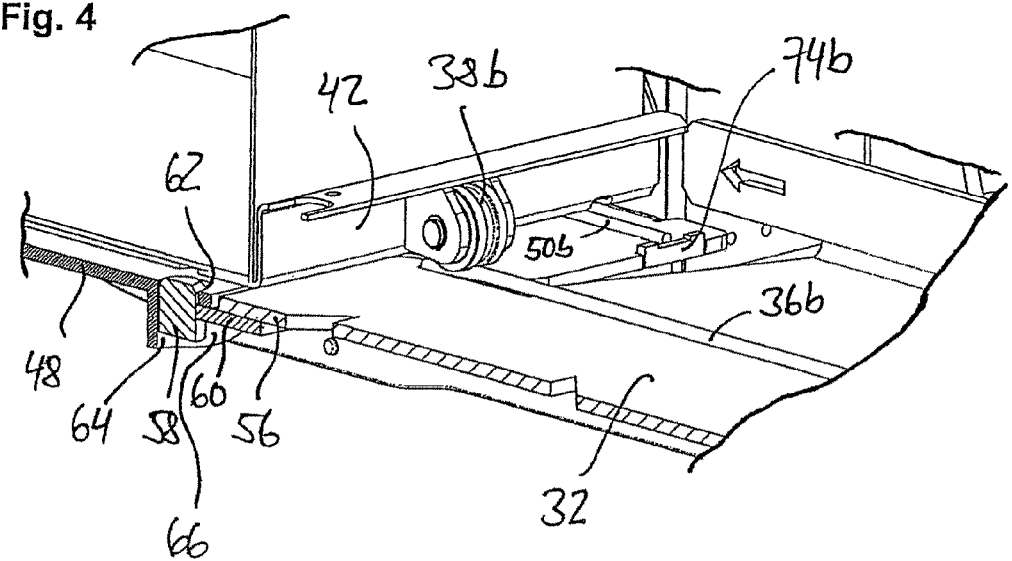
FIG. 4 shows a perspective partial sectional illustration corresponding to the section line IV-IV in FIG. 3, with in particular a coupling apparatus being shown.

FIG. 4 shows a perspective partial sectional illustration of the coupling between the changeable adapter 22 and the base 48 of the battery compartment 16, with the section line along the dashed line IV-IV in FIG. 3 being selected. The base 32 of the changeable adapter 22 has, in its end region facing the battery compartment, a lug 56, on which a centring mandrel or centring pin 58 is fitted by means of a flange 60. The centring pin 58, during the battery changing operation shown in FIG. 4, is inserted into an opening 62, which is let into the battery base 48 and whose inner diameter corresponds substantially to the outer diameter of the centring pin 58, with the result that, during the battery changing operation, a fixed connection between the base 48 of the battery compartment 16, i.e. the industrial truck, and the changeable adapter 22 can be produced. In order to align the changeable adapter 22 in particular in the horizontal direction, downwardly protruding centring means 64 are provided on the base 48, which centring means 64 form a rear stop when the changeable adapter 22 is brought close, with the result that the changeable adapter 22 cannot be moved further beneath the industrial truck base. The centring means 64 are in the form of downwardly protruding wall sections, which form sloping guide faces 66, which simplify and assist the positioning of the centring pin 58 beneath the opening 62. When the changeable adapter 22 is brought close to the industrial truck, the interaction between the centring pin 58, the centring means 64, 66 therefore results in an alignment of the changeable adapter 22 in a predetermined position with respect to the industrial truck.

FIG. 5a shows the state when the changeable adapter 22 abuts the centring means 64 with its centring pin 58, but has not yet been raised for coupling purposes. In this position, the battery pack 14 is inserted in the battery compartment 16 and the rollers 38a and 38b reach with their outer circumference into a cutout 66 formed in the base 48 of the battery compartment, wherein the outer circumference of the rollers 38a and 38b is beneath the upper side of the battery compartment base 48. The rollers 38a and 38b therefore protrude downwards through the cutout 66. In the relative position of the changeable adapter 22 with respect to the industrial truck illustrated in FIG. 5a, the lower side of the changeable adapter 22 is above a theoretical reference line R, which in this case represents the lowest point of the industrial truck, for example, by the extent h; the ground could also be selected as the reference line.

FIG. 5b shows the changeable adapter 22 during the battery changing operation. In this state, the changeable adapter 22 and the industrial truck or the base 48 of the battery compartment are coupled to one another by the interaction of the centring pin 58 and the opening 62, with the result that the changeable adapter 22 cannot be removed from the industrial truck. In order to achieve the state of the battery changing operation, the changeable adapter 22 is raised, by means of the manually-operated lift truck 24, to the height H above the theoretical reference line R until the lug 56 has been inserted into the cutout 66 and is at approximately the same height as the base 48, with the result that the upper side of the base 48 and the upper side of the changeable adapter base 32 substantially form a common plane. As a result of the fact that the changeable adapter 22 is raised from the level h (FIG. 5a) to the level H (FIG. 5b), the guide profiles 36a and 36b come into contact with their respective roller 38a, 38b and therefore lift the battery carriage 42 or the battery pack 14 upwards, with the result that the battery pack 14 rests on the guide profiles 36a, 36b of the changeable adapter 22 at its second end 40. In this position, the battery pack 14, which at its first end 54 rests with the rollers 52a and 52b on the guide profiles 50a and 50b in the battery compartment (FIG. 8a), can be withdrawn onto the changeable adapter 22, wherein in the process the rollers 38a and 38b and 52a and 52b are rolled off. The withdrawal takes place in the direction B, as can be seen from FIG. 5c.

FIG. 6 shows an enlarged cross section of the coupling region between the changeable adapter 22 and the industrial truck in accordance with the encircled region VI of FIG. 5c.

The abovementioned components of the centring pin 58, the opening 62, the centring means 64, the lug 56 and the flange 60 are shown. In order to further simplify the insertion of the pin 58 into the opening 62 when the changeable adapter 22 is raised, the pin 58 has bevelled regions 70 on its upper outer circumference. It can also be seen from FIG. 6 that end sections 72a, 72b of the guide profiles 36a, 36b are designed so as to rise in the direction away from the battery compartment. The upper edge 73 of the guide profiles 36a and 36b is therefore located slightly above the upper edge 75 of the guide profiles 50a, 50b (FIGS. 8a, 8b), with the result that the battery pack is arranged slightly higher on the changeable adapter than in the battery compartment during the battery changing operation.

As can be seen from FIGS. 3, 4 and 8b, securing stops 74a, 74b are arranged in the region of the ends of the guide profiles 50a, 50b on the access-opening side, which securing stops are used as a stop for the rollers 52a, 52b if a battery pack is intended to be withdrawn from the battery compartment without the changeable adapter 22. These securing stops 74a and 74b can be overcome merely by raising the battery pack relative to the battery compartment. In the case of the changeable adapter 22, the securing stops 74a, 74b are overcome by the rising end sections 72a, 72b of the guide profiles 36a, 36b. These end sections 72a, 72b overlap the guide profiles 50a, 50b during the battery changing operation, with the result that, when the battery pack is withdrawn from the battery compartment, the support of the battery pack in this region of overlap UB transfers from the outer roller pair 52a, 52b to an inner roller pair 76a, 76b at the first end 54 of the battery pack 14 or of the battery carriage 42, wherein the outer roller pair 52a, 52b is lifted off from the battery compartment guideways 50a, 50b and can be moved over the securing stops 74a, 74b.

If the battery pack is located completely on the changeable adapter 22, as is illustrated in FIGS. 7a and 7b, it therefore rests on the guide profiles 36a, 36b with the two roller pairs 38a, 38b and 76a, 76b. If the battery pack 14 has been completely withdrawn onto the changeable adapter 22, it comes into contact with a front stop 80 with its second end 40, in particular with the rollers 38a, 38b, as a result of which stop the movement of the battery pack 14 on the changeable adapter 22 is stopped.

As has already been mentioned with reference to FIG. 2, a locking element 46, which makes it possible to secure the battery pack on the changeable adapter, is provided in the region of the front stop 80. For this purpose, as shown in FIG. 9, the locking element 46 has a pivotably mounted, latch-like hook 82, which is subjected to spring prestress by means of a compression spring 84, with the result that it comes into engagement with the opening 44 when the battery pack 14 or the battery carriage 42 is moved forwards and engages in locking fashion behind the rim of said opening. As can be seen from FIG. 2, the hook can be pivoted upwards, counter to the spring prestress force, by means of a tripping lever 86, with the result that it releases the battery carriage 42 again. The actuation of the lever 86 generally takes place by means of an operator's foot.

If the battery pack 14 is completely accommodated on the changeable adapter 22, as illustrated in FIG. 7a, the changeable adapter 22 can be lowered from the level H above the theoretical reference line R to a level h' above the theoretical reference line R (FIG. 7b), with the result that the coupling between the centring pin 58 and the battery compartment base opening 62 is released. Then, the changeable adapter together with the battery pack 22 accommodated thereon, can be moved away from the industrial truck by means of the manually-operated lift truck 24.

If the battery pack 14 is accommodated in a separate battery carriage 42, the battery pack can be removed from the battery carriage 42 of the changeable adapter 22, for example by means of a hoist or a crane, as is indicated schematically in FIG. 10. As a result, for example, a defective battery pack 14 can be replaced. As soon as a fresh battery pack 14 has been inserted in the battery carriage 42, the battery pack 14 together with the changeable adapter 22 can be docked onto or coupled to an industrial truck with an empty battery compartment, and the battery pack can be rolled, together with the battery carriage 42, along the guide profiles 36a, 36b and 50a, 50b into the battery compartment. As soon as the battery carriage has arrived at a rear stop in the battery compartment, the changeable adapter 22 is lowered again in order to release the coupling to the industrial truck and in order to lower the battery pack, with the result that it rests with its rim at the second end 40 or with the rim of the battery carriage 42 on the battery compartment base, with the rollers 38a, 38b of the second end, as already described, protruding into a cutout in the battery compartment base.

FIG. 12 shows a changeable adapter 122, which is fixedly connected to an electric manually-operated fork-lift truck 124. The changeable adapter 122 is in this case preferably screwed or welded to the load forks 126 of the manually-operated fork-lift truck 124. The changeable adapter 122 has a centring mandrel 158 at its left-hand end, in relation to FIG. 12, which centring mandrel 158 is arranged on the changeable adapter 122 by means of a flange 160. However, the centring mandrel 158, together with the flange 160, can be removed from the changeable adapter 122, with the result that a changeable adapter 122 is formed, as is illustrated in FIG. 13. A battery pack 114, as is known from the prior art (see FIG. 11 and associated introductory description), is accommodated on the changeable adapter 122 in FIG. 13a). In this case, the battery pack 114, with a coupling projection 111 fitted on its lower side, is in engagement with a recess or groove 258 provided on the changeable adapter 122, as can be seen from the enlarged partial illustration of FIG. 13. The groove 258 runs transversely with respect to the battery displacement direction and enables secure coupling between the battery pack 114 and the changeable adapter 122 since the coupling projection 111 cannot spring out of the groove 258 as a result of the high battery weight. In order to produce the coupling between the projection 111 and the groove 258 in a more simple manner, the changeable adapter 122 has an inclined guide face 259 in relation to that in FIG. 13b) on the right-hand side of the groove 258, wherein a battery pack 115 accommodated in the industrial truck stops against said guide face with its coupling projection 111, if necessary, or the battery pack 114 is raised slightly upwards by this inclined guide face 259, with the result that, in the event of a displacement movement of the changeable adapter 122 in the direction of the coupling projection 111, a correct alignment and subsequently correct coupling between the battery pack 114 and the changeable adapter 122 is made possible.

The changeable adapter 122 proposed in FIGS. 12 and 13 represents a type of universal adapter, by means of which both battery packs 14 with a plurality of rollers 38a, 38b, 52a, 52b, 76a, 76b can be accommodated with the first coupling apparatus 158 fitted and by means of which also battery packs 114 with a coupling projection 111 and rollers 152 can be transported.

When the changeable adapter 122 is fitted fixedly on the manually-operated fork-lift truck 124, it is of course ensured that corresponding receptacles are provided at storage or charging stations for the battery, onto which receptacles the battery packs 14 and 114 can be set down, without the adapter 122 being required for the storage.

The invention claimed is:

1. A changeable battery pack adapter for accommodating a battery pack, which is capable of being withdrawn from a battery compartment of an industrial truck, or for providing a battery pack, which is capable of being inserted into the battery compartment;
wherein the changeable adapter is capable of being aligned in a predetermined position for a battery changing operation relative to the industrial truck by means of mutually interacting alignment means provided on the changeable adapter and on the industrial truck;
wherein the changeable adapter comprises two guideways that guide the movement of rolling bodies associated with the battery pack out of or into the battery compartment, the two guideways are laterally spaced apart from one another, and the rolling bodies of the battery pack are capable of moving on the guideways;
wherein end sections of the guideways, which face the battery compartment during the battery changing operation, rise away from the battery compartment and then are substantially horizontal such that, during the battery changing operation, the battery pack is positioned higher on the changeable adapter than in the battery compartment and, as a result, a securing stop arranged in the battery compartment is capable of being overcome.

2. The changeable battery pack adapter according to claim 1,
wherein the changeable adapter is configured to overcome the securing stop, which is arranged at an end of a guideway in the battery compartment, during the battery changing operation when the battery pack is moved out of the battery compartment onto the changeable adapter and from the changeable adapter into the battery compartment;
wherein one or more rolling bodies associated with the battery pack are capable of rolling on the guideway in the battery compartment.

3. The changeable adapter according to claim 1, wherein the changeable adapter is capable of being coupled to the industrial truck by means of a first coupling apparatus during the battery changing operation.

4. The changeable battery pack adapter according to claim 3,
wherein the first coupling apparatus for coupling the changeable adapter to the industrial truck is designed to produce the coupling when the changeable adapter is raised relative to a base, which bears the battery pack, of the industrial truck, and to release the coupling when the changeable adapter is lowered relative to the base of the industrial truck.

5. The changeable adapter according to claim 4, wherein the first coupling apparatus comprises at least one centring pin that engages in a corresponding opening in the base of the industrial truck during raising.

6. The changeable adapter according to claim 1, wherein the changeable adapter is designed in such a way that, during the battery changing operation and when the battery pack is accommodated in the battery compartment of the industrial truck, rolling bodies associated with a first end of the battery pack are supported in the battery compartment and rolling bodies associated with a second end of the battery pack are supported on the guideways of the changeable adapter.

7. The changeable adapter according to claim 1, wherein the changeable adapter has a releasable locking element, with which said battery pack accommodated on the changeable adapter is capable of being brought into or is in engagement.

8. The changeable adapter according to claim 3, wherein the first coupling apparatus is connected releasably to the changeable adapter.

9. Changeable adapter according to claim 8, wherein the changeable adapter is capable of being coupled to the battery pack by means of a second coupling apparatus during the battery changing operation, when the first coupling apparatus is removed from the changeable adapter.

10. Changeable adapter according to claim 9, wherein the second coupling apparatus is designed to produce the coupling between the changeable adapter and the battery pack when the changeable adapter is raised relative to a base, which bears the battery pack, of the industrial truck, and to release the coupling when the changeable adapter is lowered.

11. Changeable adapter according to claim 10, wherein the second coupling apparatus has an accommodating depression, which runs transversely with respect to the movement direction of the battery pack and with which a coupling projection, which is provided on the lower side of the battery pack, is capable of being brought into engagement.

12. The changeable adapter according to claim 1, wherein the changeable adapter is or is capable of being accommodated on a separate industrial truck.

13. The changeable adapter according to claim 3, wherein the alignment means act as the first coupling apparatus.

14. The changeable adapter according to claim 5, wherein the corresponding opening in the base of the industrial truck is in the base of the battery compartment.

15. The changeable adapter according to claim 12, wherein the separate industrial truck is a manually-operated lift truck.

16. The changeable adapter according to claim 12, wherein the changeable adapter is or is capable of being fixedly connected to the separate industrial truck.

* * * * *